United States Patent
Anderson et al.

(10) Patent No.: US 10,474,246 B2
(45) Date of Patent: Nov. 12, 2019

(54) MULTI-PRESS INPUT AND CONTROL DEVICE AND PROCESS

(71) Applicants: Mark Phillip Anderson, Hammonton, NJ (US); David Ben Anderson, Hammonton, NJ (US)

(72) Inventors: Mark Phillip Anderson, Hammonton, NJ (US); David Ben Anderson, Hammonton, NJ (US)

(*) Notice: Subject to any disclaimer, the term of this patent is extended or adjusted under 35 U.S.C. 154(b) by 20 days.

(21) Appl. No.: 15/882,446

(22) Filed: Jan. 29, 2018

(65) Prior Publication Data

US 2019/0235639 A1    Aug. 1, 2019

(51) Int. Cl.
  *G06F 3/023*    (2006.01)
  *G06F 3/0488*   (2013.01)
  *G06F 3/02*     (2006.01)

(52) U.S. Cl.
  CPC .......... *G06F 3/0233* (2013.01); *G06F 3/0202* (2013.01); *G06F 3/04886* (2013.01)

(58) Field of Classification Search
  CPC ...... G06F 3/0233; G06F 3/0235; G06F 3/018; G06F 3/04886; G06F 3/0238; G06F 3/0219; H03M 11/08; H04M 1/274558
  See application file for complete search history.

(56) References Cited

U.S. PATENT DOCUMENTS

| | | | | |
|---|---|---|---|---|
| 3,967,273 A * | 6/1976 | Knowlton | ............ | G06F 3/0233 341/22 |
| 5,117,455 A * | 5/1992 | Danish | ............. | G06F 3/0233 341/22 |
| 5,392,338 A | 2/1995 | Danish et al. | | |
| 6,184,803 B1 * | 2/2001 | Burrell, IV | ........... | G06F 3/0235 341/22 |
| 6,307,549 B1 * | 10/2001 | King | ............ | G06F 3/0219 715/810 |
| 6,802,661 B1 * | 10/2004 | Lee | ............ | G06F 3/0236 341/22 |
| 6,847,706 B2 | 1/2005 | Bozorgui-Nesbat | | |
| 2003/0095104 A1 * | 5/2003 | Kandogan | ............ | G06F 3/0233 345/168 |
| 2006/0114235 A1 * | 6/2006 | Larom | ............ | G06F 3/0233 345/169 |
| 2006/0267804 A1 * | 11/2006 | Pham | ............ | G06F 3/0236 341/22 |

* cited by examiner

*Primary Examiner* — Koosha Sharifi-Tafreshi
(74) *Attorney, Agent, or Firm* — Matthew Anderson (57) ABSTRACT

A keypad having a keypad frame and at least three input devices arranged in a grid layout within the keypad frame. A signal output is generated by the keypad after two sequential actuations of any two selected input devices of the at least three input devices. A first selected input device of the two selected input devices selects a block of signal outputs associated with the first selected input device, the block of signal outputs being mapped to match the grid layout of the at least three input devices. A second selected input device of the two selected input devices selects a particular signal output from the block of signal outputs, the second selected input device corresponding in a relative position with a position of the particular signal output in the block of signal outputs.

16 Claims, 7 Drawing Sheets

MULTI-PRESS INPUT AND CONTROL DEVICE AND PROCESS

THE FIELD OF THE INVENTION

This invention relates to textual and control character input technology as used in hardware keyboards, in on-screen software keyboards composed of two or more keys, or in other input devices.

BACKGROUND OF THE INVENTION

Current key-based user input technologies present various limitations due to the decreasing size of devices and consequently the space available devoted to user input. Some of these problems include: 1) a large number of small keys which cause the user to hit the wrong one, 2) sequential pressing of a single key to select one of a number of possible letters, 3) having to switch between different input mode screens to enter letters, numbers, or punctuation, 4) predictive completion methods that provide the wrong suggestions, 5) limited or no capability to enter punctuation, control characters, or function keys, and 6) having to introduce artificial delays between certain character combinations.

Standard 104-key, WINDOWS keyboards are usually laid out in the QWERTY scheme and provide a full American Standard Code for Information Interchange (ASCII) character set via shift keys in addition to other functions. These are large and prevent any minimization at least because each letter and number must be individually represented. As a result, the various re-arrangements of QWERTY keyboards for laptops are large and hardly more compressed.

More compressed schemes for cellphones, particularly non-internet-connected cellphones with nine to twelve buttons for text entry, are simply based on original phone button inputs like that in U.S. Pat. No. 5,392,338. This scheme allows only input of letters, numbers, and the special characters * and #. The inputs for cellphones have been improved very little, instead relying on auto-completion or, for small keys, auto-correction.

A rarely-used scheme for more efficiently entering a limited set of characters (A-Z, 0-9, and ?![%(@)]) is shown in U.S. Pat. No. 6,847,706. This patent uses two different key presses for rarely-used characters and double key presses for common keys, while requiring special keys for spaces, backspace, and switching between letters and numbers. The keyboard provides no capabilities for other characters such as commas, periods, or quotes. Finally, the device treats soft-keys differently from mechanical keys, using a select/unselect process for soft-keys instead.

The U.S. Pat. No. 6,847,706 patent relies completely on directionality for the user to translate key-press-sequences into the correct character. This requires that certain keys wrap around and use opposing keys to correspond with the directions provided on some outside keys. Likewise, peripheral letters on internal keys require a press on a key neighboring them in the key pad. In addition, this prior patent requires switching between number and letters with a separate dedicated key called "alpha-numeric" which means that numbers do not follow the same entry method as letters. Thus, this patent is not useful for complete text entry applications.

The essence of this invention is to provide a solution to all of these problems in a uniform, logical, deterministic, user-friendly manner by employing a small keyboard apparatus containing a number of textual and control characters per key and a method for the user to easily indicate which of said characters is to be selected.

This invention provides a method and apparatus to improve the speed of entry and extend the number of textual and control characters that can be entered from a smaller set of input devices. As a result, the invention provides a means to reduce the number of keyboard input devices required to support a given set of textual and/or control characters.

This invention provides complete 104-key keyboard functionality on a matrix of twelve input keys that comprise a physical keyboard or an on-screen keyboard. Deficiencies in the standard character entry methods, where multiple presses of the same key are used to select different characters assigned to that key, are eliminated so that no pausing is required, and generally only two presses of the input devices are required to enter a ASCII textual or control character.

SUMMARY OF THE INVENTION

Embodiments of the invention provide a means to enter a very large set of textual and control characters from a small keyboard. In accordance with one embodiment, an input apparatus is composed of a two-dimensional matrix of input devices or keys, hereafter called input devices, with each input device displaying a two-dimensional matrix of textual and control characters in the same layout as the matrix of input devices. An individual character is selected by pressing the first input device containing the character to be selected followed by pressing the second input device that corresponds to the position of the character to be selected in the matrix displayed on the first input device.

One embodiment provides a matrix of input devices which the user can press sequentially to select characters from a full ASCII, 104-key keyboard. The first press of the input device identifies a matrix of characters corresponding to the particular input device, and the second press selects a single character from the matrix. The input device pad can have a three-by-three block of input devices or a four-by-three block of input devices, or more depending on the number of different characters needed.

The matrix of input devices provides a means to reduce the number of keyboard input devices required to support a given set of textual and/or control characters. The input devices are pressed with no required delays in order to provide deterministic timing. Likewise, compared to standard manual cellphone keyboards, this method reduces the number of input device presses required to enter any particular textual or control character.

The stated method and apparatus could be used with any language, natural or otherwise, which can be transformed into displayable characters. In addition, the process is expandable to larger arrays of input devices and larger character sets in other languages, for instance.

Extensions beyond a three-by-three matrix of input device, however, can result in 1) user selection of the correct second input device being less intuitive and 2) the small size of individual characters on each input device becoming an issue. That is, the matrix for the larger keyboard is not intuitively the same size as the matrix for each key, resulting in irregularities.

To provide a solution to these problems, extensions to the basic three-by-three keyboard are developed to expand the number of characters available and allow for the ability of a set of one or more small satellite keyboards (e.g. one-by-three) to be used in combination with a main keyboard so that any one input device of the three-by-three keypad is kept within the limits of a three-by-three matrix.

That is, each input device of the three-by-three keyboard need only show a three-by-three matrix of characters and no more. The additional row or array of input devices then allows mark-up or variation of the characters in the three-by-three keyboard. No wrapping, directionality, or neighbor-based relationship is needed; since once the correct matrix is selected, the user merely presses the input device corresponding to the target character in that matrix.

In addition to increased intuitiveness, this process of character selection allows for quick memorization and sight-free input. This is because once the three-by-three matrix on each input device is memorized (or even just the most common positions, which is just a few such matrices), then the user's thumb position is easily intuited. That is the sequence can be easily mapped mentally as a matrix selection with one key, then character selection with another.

A keypad having a keypad frame; at least three input devices arranged in a grid layout within the keypad frame, the input devices being separately actuatable; and a processor electrically connected to the input devices, such that a signal output is generated by the keypad after two sequential actuations of any two selected input devices of the at least three input devices, a first selected input device of the two selected input devices selects a block of signal outputs associated with the first selected input device, the block of signal outputs being mapped to match the grid layout of the at least three input devices, and a second selected input device of the two selected input devices selects a particular signal output from the block of signal outputs, the second selected input device corresponding in a relative input device position in the grid layout with a relative signal output position of the particular signal output in the block of signal outputs. The keypad can have four input devices.

A keypad having at least twelve input devices provided in at least a first group and a second group, the first group comprising nine input devices in a square grid layout, the second group comprising three input devices provided in a row layout; and a processor electrically connected to the input devices, such that a signal output is generated by the keypad after two sequential actuations of any two selected input devices of the at least twelve input devices, and, if the two selected input devices are within the first group, then a first selected input device of the two selected input devices selects a particular 3×3 block of signal outputs associated with the first selected input device, the 3×3 block of signal outputs being mapped to match the grid layout of first group of the input devices, and a second selected input device of the two selected input devices selects a particular signal output from the block of signal outputs, and wherein together the first group of nine input devices and the second group of three input devices provide a full American Standard Code for Information Interchange (ASCII) character set of possible signal outputs. The keypad can have exactly twelve input devices.

Furthermore, each of the three input devices of the second group and each of the nine input devices of the first group is associated with a 3×3 block of output signals. A particular output signal is selectable from the 3×3 block of output signals by the second selected input device, so that the second selected input device corresponds in position with the particular output signal in the 3×3 block of output signals.

Further scope of applicability of the present invention will become apparent from the detailed description given hereinafter. However, it should be understood that the detailed description of the drawings and specific examples are given by way of illustration only. Various changes, combinations and modifications between designs given below that are within the spirit and scope of the invention will become apparent to those skilled in the art.

BRIEF DESCRIPTION OF THE DRAWINGS

The present invention will become more fully understood from the detailed description given below and the accompanying drawings which are given by way of illustration only, and thus do not limit the present invention, wherein.

DETAILED DESCRIPTION OF THE DRAWINGS

Figure 1:
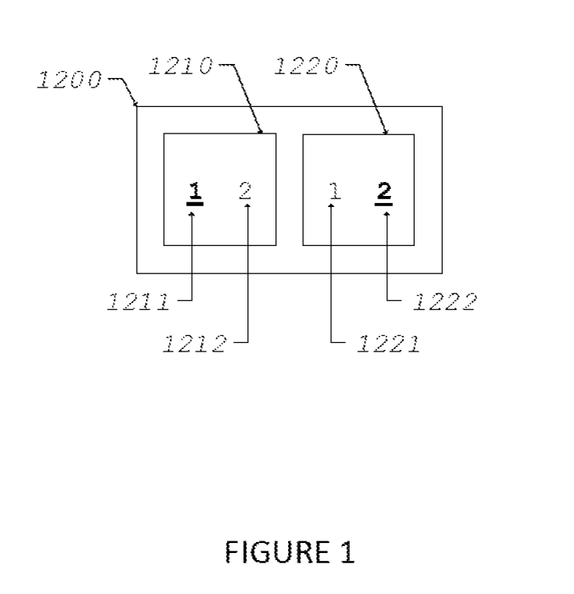
FIG. 1 is a layout of a keyboard with two input devices.

The detailed description begins with the simplest keyboard possible for explanatory purposes. FIG. 1 depicts the simplest keyboard 1200 possible using a 1×2 matrix of input devices. This keyboard is composed of two input devices, input device 1210 and input device 1220. Each input device has two corresponding character positions, position 1 on the left 1211 and position 2 on the right 1212 of input device 1210; and position 3 on the left 1221 and position 4 on the right 1222 of input device 2 1220. The character position on an input device that corresponds to the position of the input device itself on the keyboard is highlighted using some combination of either bold, underline, boxed, encircled or some other method. For instance, position 1211 on input device 1210 of the keyboard 1200 is highlighted with a bold underlined 1.

A character on the keyboard can be selected by the following method. The input device that displays/contains the character of interest is pressed first. Then another input device is pressed that corresponds to the position of the character of interest on the first input device pressed. For example, to select the character at position 1221, first press input device 1220 since the character at position 1221 is visible on that input device, then press input device 1210 since the character at position 1221 is located in the left position on input device 1220. Similarly, to select the character at position 1222, press input device 1220 twice.

In other words, keyboard 1200 defines a one dimensional matrix. To select an element in the matrix, first an inner matrix containing the element is selected, then, based on the position of the element of interest 1221 in the matrix, a second key (which can be the same key) is selected to identify the element 1221 within the inner matrix.

Figure 2:
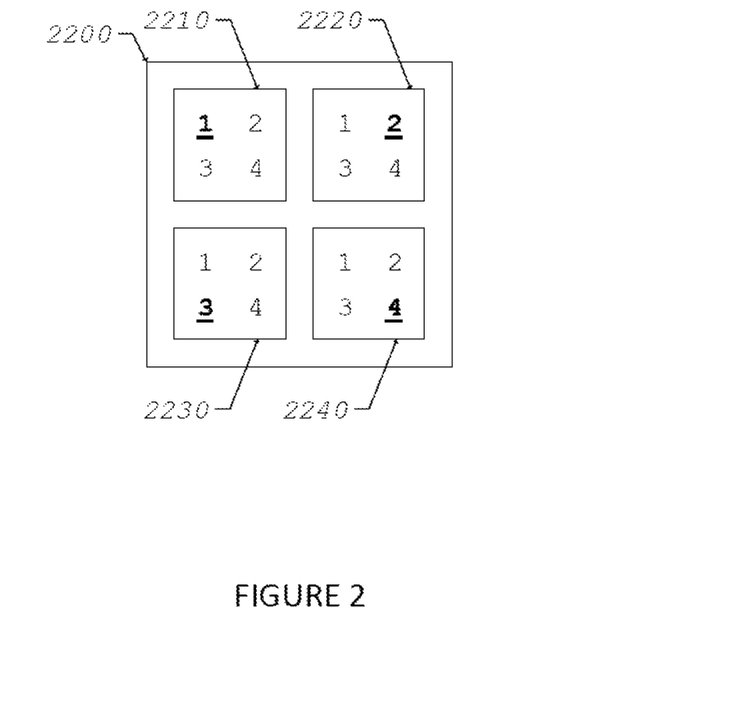
FIG. 2 is a layout of a keyboard with four input devices.

FIG. 2 depicts a matrix keyboard 2200 containing four input devices 2210, 2220, 2230 and 2240, arranged in a 2×2 matrix. Each key or input device displays four characters in a 2×2 matrix. This keyboard arrangement provides for input of 16 different textual or control characters.

As can be seen in FIG. 2, each key or input device relates to a matrix with four positions that mirror the layout of the keys. Thus, selection of a character in this keyboard is performed in much the same way as that in FIG. 1, except in two dimensions. That is, to select the character at position 3 on input device 2240, first the user would press input device 2240 to select that set of characters (which includes the one desired), then the user would press input device 2230, since that key corresponds to position 3 in the matrix of input device 2240.

Likewise, to select the character at position 4 of input device 2210, the user would press input device 2210, then the user would press input device 2240 which selects the fourth position out of the matrix corresponding to input device 2210. Finally, to select the character at position 2 of input device 2220, the input device 2220 would be pressed twice. Indeed all of the positions requiring only two identical repeated presses on the same key are bolded and underlined in the matrices.

Figure 3:
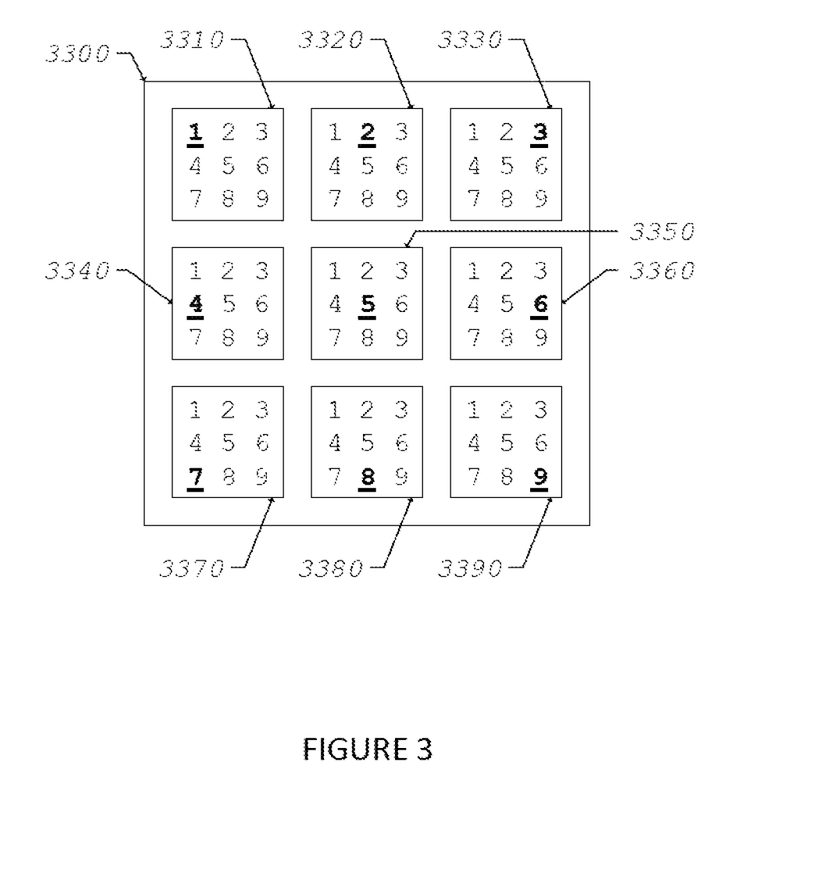
FIG. 3 is a layout of a keyboard with nine input devices.
Figure 6:
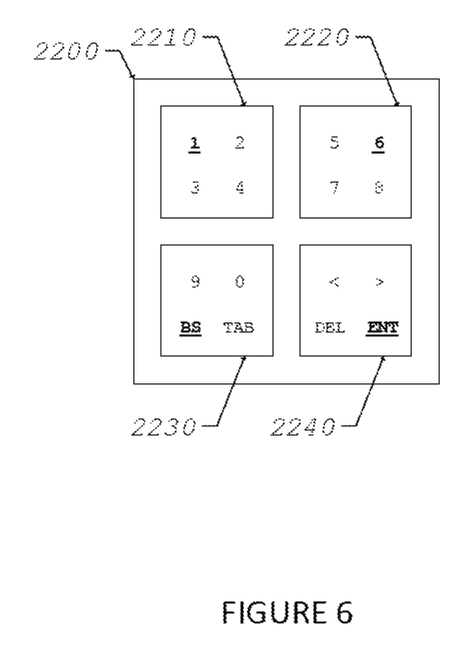
FIG. 6 is an exemplary character placement on the layout of FIG. 2.

FIG. 3 depicts a larger matrix keyboard 3300 that contains nine input devices (3310, 3320, 3330, 3340, 3350, 3360, 3370, 3380, 3390) arranged in a 3×3 matrix. Each key or input device displays nine positions in a 3×3 matrix; different characters can be assigned to these positions. In total, this keyboard arrangement provides for the input of 81 different textual or control characters using the same basic method as described above. FIG. 6 provides an exemplary implementation of the keyboard layout of FIG. 3.

Specifically, input devices 3310, 3320, and 3330 correspond to matrix positions 1, 2, and 3, respectively, in each matrix on the input devices. Likewise, input devices 3340, 3350, and 3360 correspond to matrix positions 4, 5, and 6, respectively; and input devices 3370, 3380, and 3390 correspond to matrix positions 7, 8, and 9, respectively.

To select the character at position 6 of input device 3350, first the input device 3350 is pressed, and then input device 3360 is pressed. Likewise, to select the character at position 9 of input device 3310, first input device 3310 is pressed, then input device 3390 is pressed to select within the matrix shown on input device 3310.

Figure 4:
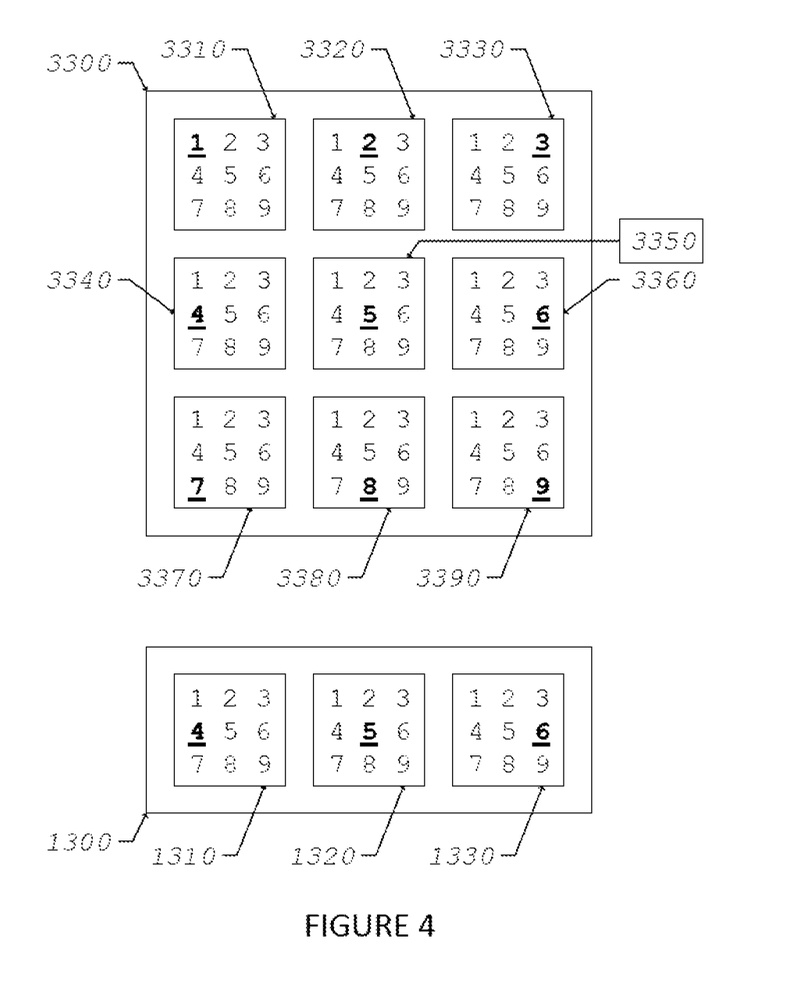
FIG. 4 is a layout of a keyboard with twelve input devices.

As stated previously, although keyboard layouts in grids larger than 3×3 are possible, usability may suffer. To work around this potential limitation one or more satellite input devices are introduced to allow input of additional textual and control characters. In keeping with the goal of describing the apparatus and methods of implementing a PC-104 keyboard (or full ASCII), three additional satellite input devices (keys) are added that are arranged below the main 3×3 array of input devices of FIG. 3 as shown in FIG. 4.

The satellite keyboard 1300 includes input devices 1310, 1320, and 1330 which each have a 3×3 matrix of characters/controls corresponding to each key in the main keyboard. To utilize the 3×3 matrix on the satellite keyboard, one of the input devices on the satellite keyboard 1300 is pressed, then one of the nine input devices on the main keyboard 3300 is pressed which corresponds to the position of the character to be selected from the pressed input device of the satellite keyboard.

Thus, to select the character or control input at position 6 of input device 1320 of the satellite keyboard, first the input device 1320 is pressed, then input device 3360 is pressed. Likewise, to select the character at position 6 of 1330, first the input device 1330 is pressed, then 3360 is pressed. As a result, the satellite keyboard 1300 is only used for the first press of a character selection so as to provide additional matrices for selection.

The first press of an input device in the satellite keyboard 1300, is followed by a second press on the main keyboard that selects within the selected matrix. The selections of the main keyboard 3300 and the satellite keyboard 1300 can be provided to a common processor. In addition, or alternatively, the selection of an input device on the satellite keyboard can trigger the main keyboard to transmit selections only to the satellite for combination and character generation.

Furthermore, the satellite keyboard 1300 can act as a standalone device alongside the main keyboard 3300. That is, the characters at positions in the middle rows of the satellite keyboard 3300 can be accessed with the first and second key presses being on the satellite keyboard. This provides an additional method for quick input of control inputs or characters at these positions without the user moving their fingers to the main keyboard 3300. For instance, the character at position 5 of input device 1320 can be entered by either pressing input device 1320 twice, or by pressing input device 1320 and then input device 3350.

Figure 5:
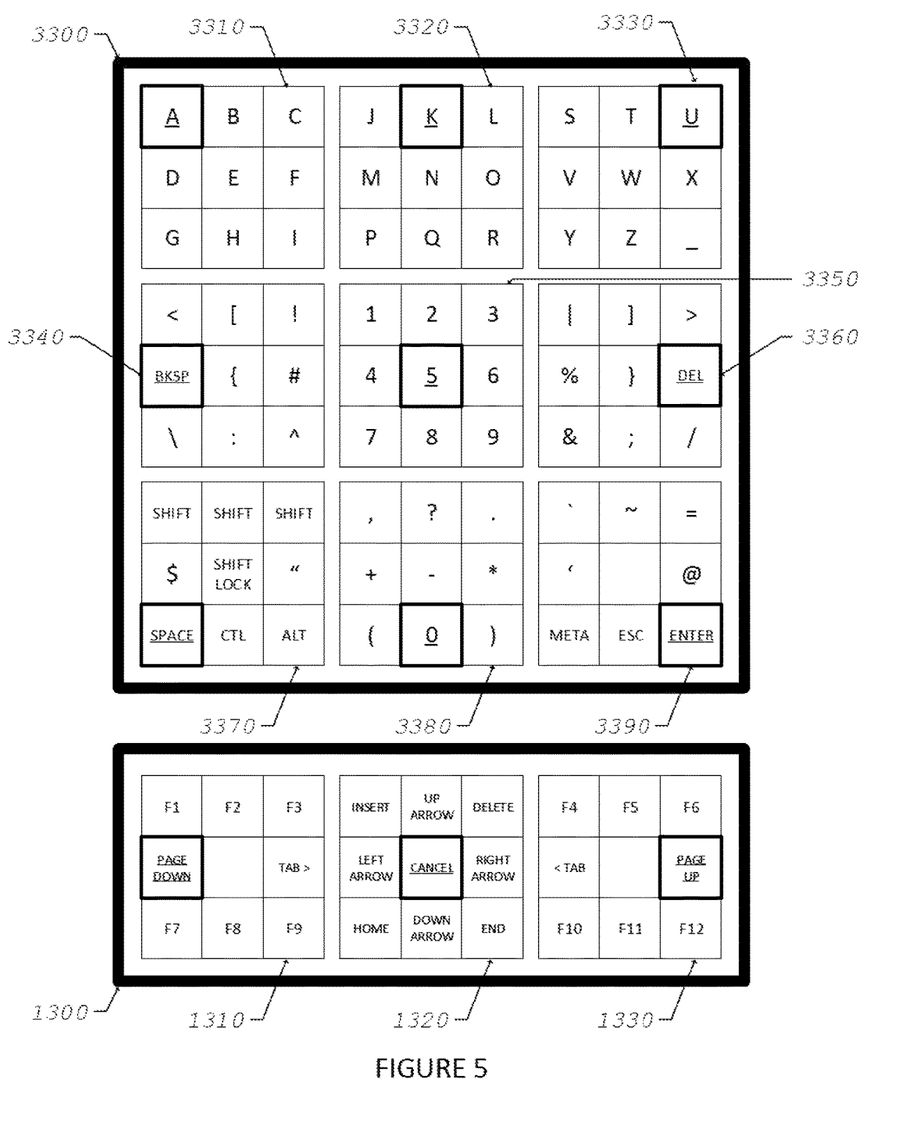
FIG. 5 is an exemplary character placement on the layout of FIG. 4.

FIG. 5 depicts the apparatus for the full ASCII keyboard consisting of twelve input devices configured as a 3×3 block and a 1×3 block. Displayed on the input devices are the exemplary textual and control characters which cover the full input ability of a PC-104 keyboard. In addition, there are spaces in input devices 3390, 1310, and 1330 for other control inputs or characters to be placed at those positions.

Selection of a particular character on the 1×3 block of input devices is accomplished by first pressing the input device containing the character and then pressing the input device in the 3×3 block of input devices that corresponds to the position of the character in the matrix on the previously pressed input device of the satellite keyboard 1300. Or selection of a particular character in the middle row of each matrix of the 1×3 block of keys can be selected by using only the 1×3 block of keys as described above.

Certain key sequences may be used to indicate a modifier that applies to the following character. The following words that appear on keys in FIG. 5, including SHIFT, CTL, ALT, ESC, and META, introduce a modifier sequence that will affect one or more of the characters that follow the modifier. Not all combinations of modifiers and characters produce a new input character; that is to say, some characters may be unaffected by modifiers.

SHIFT will cause the following single character to be shifted. This can be used to create capital letters, A-Z as well as shifted function keys, SHIFT-Fn. SHIFT is the only modifier that consists of a single press of an input device. Since SHIFT is provided in positions 1-3 of the matrix corresponding to input device 3370, the pressing of input device 3370 can be treated specially such that a press of it followed by another two input devices produces a SHIFT along with the selected character. This improves functionality, but is not a necessary function.

For instance, SHIFT-F2 is produced by pressing input device 3370, then input device 1310, then input device 3320, resulting in an odd number of key entries to generate the control input of SHIFT-F2. Likewise, for capital F, first input device 3370 is pressed, then input device 3310, then input device 3360. For caps lock, the user can use SHIFT LOCK through input device 3370.

CTL, ALT, ESC, and META can be designed to affect only the next single character. These modifiers are selected using the standard method of pressing two various input devices. Serial combinations of these modifiers are also allowable and function as if the corresponding PC-104 keys were pressed at the same time. For instance, ALT-F2 is performed by pressing input device 3370, then input device 3390, then input device 1310, then input device 3320.

Likewise, CTL-ALT-DEL is performed by pressing: input device 3370, then input device 3380, then input device 3370, then input device 3390, then input device 3360 twice. In addition, the keyboard in FIG. 5 provides TAB-LEFT and TAB-RIGHT which manipulate indents in various word processors by shifting by a TAB to the left or right, respectively. The bolded square in each input device matrix is the position or character which requires only two sequential presses of that input device. That is, backspace (BKSP) requires only two presses of 3340.

Some frequently used functions have been selected to populate these special positions for ease of use. However, the placement of any character on the keyboard could, in practice, be changed with any other. Thus, these minor variations in placement are entirely within the scope of this invention.

The control input SHIFT LOCK is different in another way. A two press sequence selecting SHIFT LOCK, toggles the input of the letters A-Z into capitalization mode or back into lower case mode. Thus, a one key sequence affects the input of the letters a-z for as long as the toggle is not switched back. This is implemented by the keyboard controller as a true/false (Boolean) variable. It can be a mode applied only to the letters (like caps lock) or applied as a SHIFT LOCK which modifies all other applicable characters until toggled off.

In one embodiment, an indicator can be provided on the display or as a physical indicator, e.g. an LED, to indicate if SHIFT LOCK is off or on. This LED or indicator is preferably a backlight to the center of input device 3370 and visible only in the middle where SHIFT LOCK is provided (as in FIG. 5). In one embodiment, the on-screen letters A-Z on the top three input devices can be changed to display the letters A-Z or a-z as appropriate when SHIFT LOCK is on or off, respectively.

The CANCEL character provides the capability to cancel a partially-entered user input. If after the first press of an input device the user decides not to continue with that input the input device 1320 displaying CANCEL may be pressed twice to cancel the input in progress. In addition, when the keyboard is first approached or used, the user may wish to press the CANCEL, or input device 1320 twice, to clear any errant input.

Another exemplary implementation, applying characters to the matrices of the input devices of FIG. 2, is shown in FIG. 6. In this implementation, only numerical inputs and control inputs are provided. This allows for quick password entry, pin numbers, or, if supplemented with another keypad, could provide input for a calculator. The control inputs are SHIFT RIGHT (>), SHIFT LEFT (<), DELETE (DEL), ENTER (ENT), TAB, and BACKSPACE (BS). The input devices 2210, 2220, 2230, and 2240 and keypad 2200 function as described in the disclosure corresponding to FIG. 2.

Figure 7A:
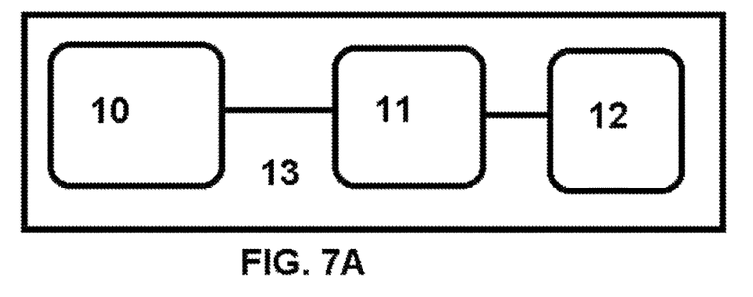
FIG. 7A is a system diagram according to one embodiment.
Figure 7B:
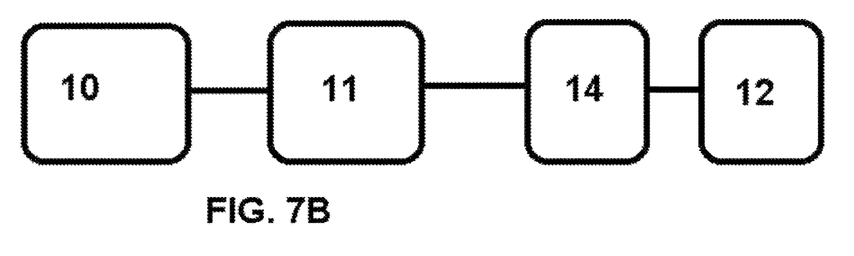
FIG. 7B is a system diagram according to one embodiment.
Figure 7C:
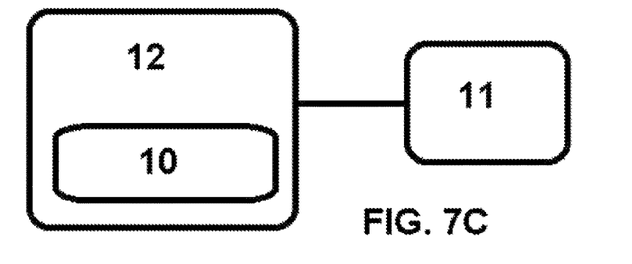
FIG. 7C is a system diagram according to one embodiment.

In FIG. 7A, the block of input devices 10 is connected to a processor 11 and a display 12 within a device 13 such as a tablet, cellphone, alarm box, etc. In FIG. 7B the block of input devices 10 is connected to a processor 11 and then through a personal computer 14 to a display 12. The connection to the computer being wired or wireless, and the input devices 10 and the processor 11 comprising a stand-alone keyboard. In FIG. 7C, the block of input devices 10 is provided within a display 12 and connected to a processor 11 for a touchscreen implementation. This implementation can be used in the device 13 of FIG. 7A as well.

The processor 11 would record the input device actuations and generate a scancode output after a valid keypress sequence. As noted previously, the input devices in this disclosure can be implemented in various ways, such as physical keys wired to a processor, as a display on a touch pad, as a display connected to a joystick for entry, or as projector display with hand recognition or gesture recognition for key selection. Furthermore, the processor connected to the entry device is specially programmed or designed to combine the key presses or input device selection and implement the various modes and control characters.

The processor preferably outputs signals compatible with those of a PC-104 keyboard over a USB, RS-232, PS/2, BLUETOOTH, IR, or other interface to a user computer. That is, despite the variation in the method of input, after the correct input, the scancode from this keyboard is compatible with standard drivers or international drivers for keyboards. In addition, the output of the keyboard can be adapted to various alarm systems, pin systems, or other specialized devices. In addition, signal output, control input, character, and textual/control character are used interchangeably in this application.

Special characters and letters with diacritical marks can be provided on another satellite keyboard. For common characters, such as ö, ä, ü, ß, the input devices can be mapped to select from matrices of their own characters. For instance, a satellite keyboard for all necessary German language special characters could be added to the keyboard of FIG. 5; however, rather than each input device of the special language keyboard mapping to a 3×3 matrix, the special language keyboard could generate the characters from its own self-referencing, two-step key inputs.

This would allow swappable language keyboards. With independent keyboards, each key sequence could simply release a scancode from a non-volatile memory register. Likewise, independent keyboards with emojicons, mathematical characters, editing shortcuts, or computer-application-specific keyboards could be provided. Some of these would require the installation of drivers to read the new scancodes.

In addition, diacritical marks alone could be provided on a satellite keyboard to function like the SHIFT key so that three presses will generate the letter with the diacritical mark. The first press or the last press could assign the diacritical mark to the selected letter. Keyboard systems with this plug-and-play functionality for satellite keyboards may have a processor to identify the satellite keyboard and combine signals into standard scancodes. Likewise, these satellites could reference 3×3 matrices of characters (27 characters each) much like the satellite in FIG. 5. to add entire categories of UNICODE character sets to the standard PC-104 keyboard.

Although specific embodiments have been illustrated and described herein, it will be appreciated by those of ordinary skill in the art that any arrangement that is calculated or designed to achieve the same purposes may be substituted for any embodiments shown. Many adaptations of the disclosure, especially the character assignments, will be apparent to those of ordinary skill in the art. Accordingly, this application anticipates these adaptations of the concepts of the disclosure.

What is claimed is:
1. A keypad, comprising:
   a keypad frame;
   a first group of nine input devices provided in a 3×3 square and arranged in a grid layout within the keypad frame; and a second group of three input devices provided in a row, the input devices being separately actuatable, wherein a signal output is generated by the keypad after two sequential actuations of any two selected input devices of the input devices, wherein a first selected input device of the two selected input devices selects a block of signal outputs associated with the first selected input device, the block of signal outputs being mapped to match the grid layout of the first group of input devices, and wherein a second selected input device of the two selected input devices selects a particular signal output from the block of signal outputs, the second selected input device corresponding in a relative input device position in the grid layout with a relative signal output position of the particular signal output in the block of signal outputs, wherein, if the two selected input devices are within the first group, then the first selected input device of the two selected input devices selects a particular 3×3 block of signal outputs associated with the first selected input device, the 3×3 block of signal outputs being mapped to match the grid layout of the nine input devices.

2. The keypad of claim 1, the keypad having a third group of three additional input devices for special language characters.

3. The keypad of claim 1, wherein the input devices are implemented as mechanical keys or segments of a touchscreen display.

4. The keypad of claim 1, further comprising: a processor recording the actuation of the first selected input device and the second selected input device and generating the signal output.

5. A keypad, comprising:
at least twelve input devices, provided in at least a first group and a second group, the first group comprising nine input devices in a square grid layout, the second group comprising three input devices provided in a row layout; and
a processor electrically connected to the input devices,
wherein a signal output is generated by the keypad after two sequential actuations of any two selected input devices of the at least twelve input devices,
wherein, if the two selected input devices are within the first group, then a first selected input device of the two selected input devices selects a particular 3×3 block of signal outputs associated with the first selected input device, the 3×3 block of signal outputs being mapped to match the grid layout of first group of the input devices, and
wherein a second selected input device of the two selected input devices selects a particular signal output from the block of signal outputs, and
wherein together the first croup of nine input devices and the second group of three input devices provide a full American Standard Code for Information interchange (ASCII) character set of possible signal outputs.

6. The keypad of claim 5, wherein each of the three input devices of the second group and each of the nine input devices of the first group is associated with a 3×3 block of output signals.

7. The keypad of claim 5, wherein a particular output signal is selectable from the 3×3 block of output signals by the second selected input device, the second selected input device corresponding in position with the particular output signal in the 3×3 block of output signals.

8. The keypad of claim 5, wherein the full American Standard Code for Information Interchange (ASCII) character set of possible signal outputs are output as scancodes.

9. The keypad of claim 1,
wherein together the first group of nine input devices and the second group of three input devices provide a full American Standard Code for Information Interchange (ASCII) character set of possible signal outputs.

10. The keypad of claim 9, wherein the full American Standard Code for Information Interchange (ASCII) character set of possible signal outputs are output as scancodes.

11. The keypad of claim 5, wherein together the first group of nine input devices and the second group of three input devices provide all outputs of a PC-104 keyboard.

12. The keypad of claim 1, wherein, if the first selected input device is within the second group and the second selected input device is within the first group, then the first selected input device of the two selected input devices selects a particular 3×3 block of signal outputs associated with the first selected input device, the particular 3×3 block of signal outputs being mapped to match the grid layout of the first group of the nine input devices.

13. The keypad of claim 5, wherein, if the first selected input device is within the second group and the second selected input device is within the first group, then the first selected input device of the two selected input devices selects a particular 3×3 block of signal outputs associated with the first selected input device, the particular 3×3 block of signal outputs being mapped to match the grid layout of the first group of the nine input devices.

14. The keypad of claim 5, wherein, if the first and second selected input devices are within the second group, then the first selected input device of the two selected input devices selects a center row having a 1×3 block of signal outputs associated with the first selected input device, the 1×3 block of signal outputs being mapped to match the grid layout of the second group of the three input devices.

15. The keypad of claim 11, wherein signal generation of at least one character of the PC-104 code set is preceded by generation of a signal output of a CTL character, an ALT character, a META character, or a SHIFT character.

16. The keypad of claim 11, wherein the outputs of the input devices provide a full PC-104 code set of signal outputs, the signal outputs being transmitted as scancodes.

* * * * *